Aug. 17, 1937.  F. J. STACK  2,090,336
HEATING COIL
Filed March 2, 1936  2 Sheets-Sheet 1
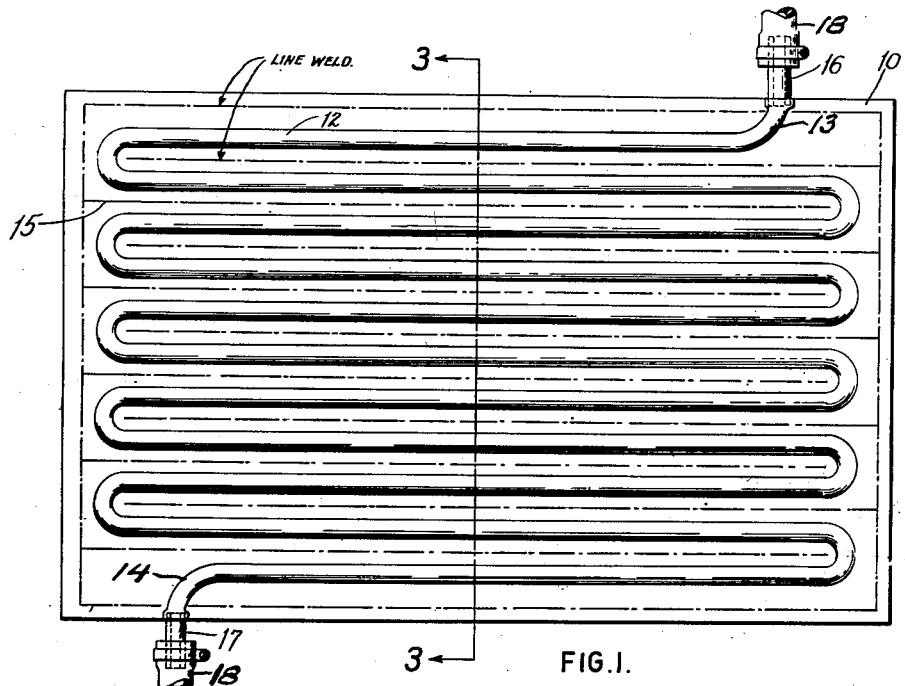
FIG.1.
FIG.2.
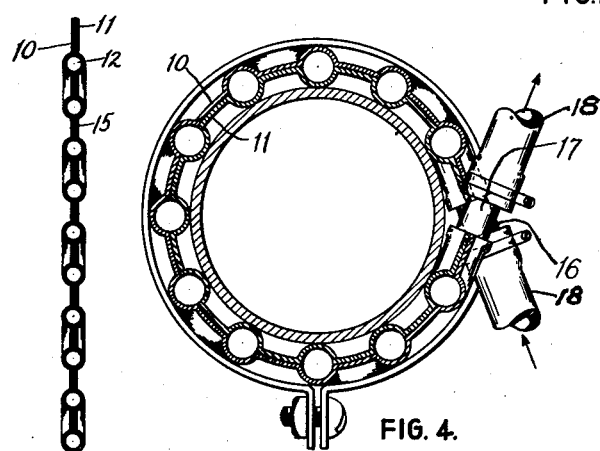
FIG. 4.
FIG.3.
INVENTOR.
Frank J. Stack
BY Slough & Canfield
His ATTORNEYs.

Aug. 17, 1937. F. J. STACK 2,090,336
HEATING COIL
Filed March 2, 1936 2 Sheets-Sheet 2

INVENTOR.
Frank J. Stack
BY Slough & Canfield
HIS ATTORNEYS.

Patented Aug. 17, 1937

2,090,336

UNITED STATES PATENT OFFICE 2,090,336

HEATING COIL

Frank J. Stack, Lorain, Ohio

Application March 2, 1936, Serial No. 66,589

4 Claims. (Cl. 257—241)

This invention relates to heat exchange units and more particularly to a unit of this type fabricated from sheet material instead of tubing.

Heretofore, seamless or welded tubes of the so-called stainless steels or stainless irons have been formed which are relatively expensive, rendering the use of this material prohibitive in heat exchange units such as a heating coil or boiler employed in automobile vehicle heaters of the hot air, hot liquid or steam type.

Heaters of this type usually comprise a unit associated with the exhaust manifold of the vehicle engine, into which air or a liquid is introduced, whereby the air is heated or steam may be generated or a liquid may be heated, which in turn transfers heat through suitable conduit means to the air in the passenger compartment of the vehicle.

The so-called stainless steels or stainless irons are particularly adaptable for this use in that they have high resistance to oxidation and are ordinarily non-corrosive, for this application.

However, as previously pointed out, the expense of the so-called stainless steels or stainless irons in tubing shape manufactured by the seamless or welded processes have heretofore prevented their uses for these and similar purposes.

It is an object of my invention, therefore, to provide a heat exchange unit formed of a low cost shape such as sheet material made from the so-called stainless steels or stainless irons adapted to automobile vehicle heaters and the like, which is relatively inexpensive to manufacture.

Another object of my invention is to provide a heat exchange unit for automotive vehicle heaters which will rapidly provide the necessary heat by placing the heat exchange unit in or adjacent to the high temperatures in the exhaust pipe or manifold.

Another object of my invention is to provide a heat exchange unit adapted to automotive vehicle heaters and the like which is highly resistant to oxidation and corrosion, thus preventing the seepage of dangerous gases from the manifold or exhaust into the passenger compartment of a vehicle such as an automobile.

Another object of my invention is to provide a heat exchange unit adapted to automotive vehicle heaters and the like possessing considerable strength and durability while permitting the use of relatively thin metals particularly suitable for the application.

Another object of my invention is to provide a continuous conduit adapted to a heat exchange unit which may be made easily and economically by die forming and welding operations.

Other objects of my invention and the invention itself will become increasingly apparent from a consideration of the following description and drawings, wherein:

Fig. 1 is a top plan view of an embodiment of my invention;

Fig. 2 is an elevational view of the embodiment of Fig. 1;

Fig. 3 is a section taken along the line 3—3 of Fig. 1;

Fig. 4 illustrates my invention adapted to the exhaust manifold of an internal combustion engine;

Figure 5:
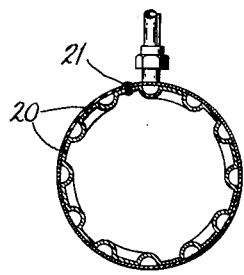
Fig. 5 is a cross-sectional view illustrating a modification of my invention.

Referring now to the drawings, I have indicated generally at 10 an upper portion of a heat exchange unit and at 11 a lower portion of such unit, each of the portions being generally similar in construction and preferably formed from the so-called stainless steels or stainless irons. The metal is initially received as flat sheet material and is subjected to a die-forming operation whereby a continuous groove semi-circular in cross-section is formed therein.

The groove, indicated at 12, comprises a plurality of interconnected U-form depressions initiating at 13 and terminating at 14.

The portions 10 and 11 are generally similarly grooved and are confrontingly disposed whereby they may be integrally united by any suitable method, as by welding. I preferably weld not only the peripheral portions of the metal, as indicated by dotted line 15, but also weld alternatively from opposite ends of the portions 10 and 11 intermediate the U-legs of each passage formed by the confronting grooved portions.

The portions 10 and 11, welded as described, will thus provide a continuous passage therebetween. Fig. 4 shows the unit bent to circular form and disposed around the exhaust manifold of an automotive vehicle engine, whereby air or a liquid introduced thereinto may be heated or converted into steam for warming the passenger compartment of the vehicle.

The unit may have a coupling member 16 sealingly secured thereto at the initiation of the conduit at 13 and a similar coupling 17 secured at the termination of the conduit at 14. The couplings 16 and 17 effect engagement with the heater conduit 18 leading to the passenger compartment of the vehicle.

The couplings 16 and 17 are preferably weldingly secured to the portions 10 and 11 adjacent opposite peripheral portions and to this end the groove terminations at the periphery may be relatively enlarged in diameter as indicated in Fig. 1. The preferably flexible conduit 18 is telescoped over the couplings 16 and 17 and sealingly clamped thereto in the conventional manner.

Figure 6:
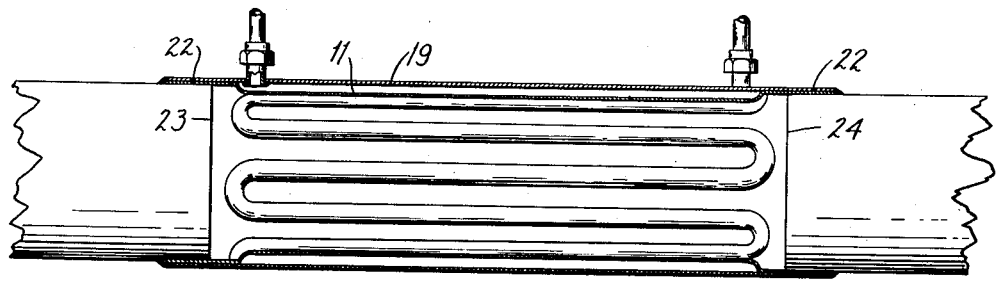
Fig. 6 is a sectional view of the modification of Fig. 5 integrally associated with an engine exhaust manifold.
Figure 7:
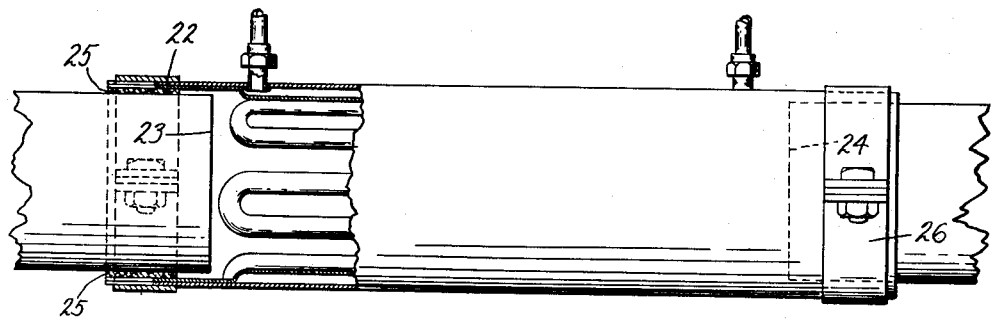
Fig. 7 is an elevational view partly in section of the modification of Fig. 5 detachably secured to an exhaust manifold.

Referring now to Figs. 5, 6, and 7, I have illustrated a modification of my invention wherein the heat exchange unit replaces a portion of the exhaust manifold and is directly heated by the exhaust gases rather than by conduction through the manifold walls as in the modification of Figs. 1 to 4 inclusive.

In this modification the inner portion or plate 11 is formed as previously described, but the outer plate 19 is preferably formed without a groove therein, the plates 11 and 19 then being weldingly secured along peripheral portions parallel and adjacent to the semi-circular groove indicated at 20, Fig. 5. Coupling elements 16 and 17 may be sealingly secured to opposite edge portions as previously described. The unit is then bent to circular form and the abutting edge portions sealingly secured by welding, as indicated at 21, Fig. 5. The abutting transverse portions of plates 11 and 19, extending beyond the terminations of the groove in plate 11, are of substantial extent as indicated at 22, Fig. 6, to provide ample area for securement of the unit to the spaced confronting ends of the exhaust manifold indicated at 23 and 24.

The end portions 22 of the unit are telescoped over the ends 23 and 24 of the exhaust manifold and sealingly secured by welding, whereby the unit becomes an integral portion of the manifold with the external diameter of the unit substantially that of the exhaust manifold.

Referring to Fig. 7, I have illustrated the unit of Fig. 5 detachably clamped to the ends 23 and 24 of the manifold and to insure a sealed joint preferably of suitable heat resistant material I provide washers 25—25 between the manifold ends and the end portions 22 of the unit tightly secured by clamps 26. I contemplate that end portions 22 of the unit may be split for a short distance longitudinally to aid in effecting a tight joint by the clamps 26.

Although I have described the unit as primarily adapted to an automotive vehicle heater, it is apparent that it is susceptible of many similar uses, such as airplanes, oil or gasoline motor driven cars and boats.

I have described and preferably employ the so-called stainless steels or stainless irons but it is understood that any sheet metal material having the desired characteristics may be employed.

Although I have shown and described a preferred embodiment of my invention, it is understood that numerous and extensive departures may be made therefrom without departing from the spirit of my invention and the scope of the appended claims.

Having thus described my invention, what I claim is:

1. A generally cylindrical heat exchange unit adapted to form a portion of the length of a generally cylindrical exhaust manifold comprising end portions adapted to be telescoped over spaced confronting ends of the manifold and sealingly secured therewith, a plurality of interconnected grooves extending longitudinally of the unit inwardly of the said end portions, and coupling elements secured to the groove terminal portions whereby the unit may be sealingly connected with a fluid conduit.

2. A generally tubular heat exchange unit adapted to be associated with the exhaust manifold of an internal combustion engine, said unit comprising a plurality of axially extending conduit portions formed in the unit wall and interconnected by transverse conduit portions, means for securing the unit to the manifold whereby waste gases of the engine may pass therethrough, and connecting means at the conduit ends whereby fluids to be heated may be passed through the conduit.

3. A generally tubular heat exchange unit adapted to become part of a conduit, said unit comprising a continuous passage formed in the unit wall extending both longitudinally and circumferentially, and coupling elements at each end of the passage adapted to be secured to a fluid supply and return line whereby heat exchange may be effected between fluid traversing the conduit and the passage.

4. A generally tubular heat exchange unit adapted to become part of a conduit through which heated fluid passes, said unit comprising a smooth outer wall and a corrugated inner wall, the walls forming therebetween a continuous passage adapted to have fluid to be heated passed therethrough, and the end portions of the inner wall being non-corrugated whereby said portions may be telescoped with portions of the conduit and sealingly secured thereto.

FRANK J. STACK.